United States Patent
Miller

(10) Patent No.: US 9,272,627 B2
(45) Date of Patent: Mar. 1, 2016

(54) ENERGY STORAGE SYSTEMS AND METHODS

(75) Inventor: John M. Miller, Oakridge, TN (US)

(73) Assignee: Maxwell Technologies, Inc., San Diego, CA (US)

(*) Notice: Subject to any disclaimer, the term of this patent is extended or adjusted under 35 U.S.C. 154(b) by 645 days.

(21) Appl. No.: 13/574,706

(22) PCT Filed: Aug. 23, 2010

(86) PCT No.: PCT/US2010/046308
§ 371 (c)(1),
(2), (4) Date: Jul. 23, 2012

(87) PCT Pub. No.: WO2011/090511
PCT Pub. Date: Jul. 28, 2011

(65) Prior Publication Data
US 2012/0319471 A1 Dec. 20, 2012

Related U.S. Application Data

(60) Provisional application No. 61/298,204, filed on Jan. 25, 2010, provisional application No. 61/298,206, filed on Jan. 25, 2010.

(51) Int. Cl.
*H02J 7/34* (2006.01)
*B60L 1/00* (2006.01)
(Continued)

(52) U.S. Cl.
CPC ............. *B60L 11/005* (2013.01); *B60L 3/0046* (2013.01); *B60L 11/1803* (2013.01);
(Continued)

(58) Field of Classification Search
CPC ............. H02J 7/34; H01M 10/44; B60L 1/00
USPC ........... 320/166, 104; 307/9.1, 10.1; 324/426, 324/427, 433; 369/1; 180/2.2; 701/36
See application file for complete search history.

(56) References Cited

U.S. PATENT DOCUMENTS 4,511,947 A 4/1985 Melocik
7,434,636 B2 * 10/2008 Sutherland ..................... 180/2.2
(Continued)

FOREIGN PATENT DOCUMENTS

CN 101388478 A 3/2009
CN 101626916 A 1/2010
(Continued)

OTHER PUBLICATIONS

International Search Report and Written Opinion for PCT Application No. PCT/US2010/046308, filed Aug. 23, 2010, mailed Feb. 7, 2012.

*Primary Examiner* — Richard Isla Rodas
*Assistant Examiner* — Dung V Bui
(74) *Attorney, Agent, or Firm* — Knobbe Martens Olson & Bear LLP

(57) ABSTRACT

In an energy storage system that includes a battery and an ultracapacitor, the state of charge (SOC) of the capacitor is the subject of a dynamic set-point. This dynamic set-point control is a function of the load regime to which the storage system is exposed, for example a hybrid automobile or electric automobile. The control may be based in part upon real-time fast Fourier transform analysis of load current, permitting real-time adjustment of control coefficients. In this way, it is possible to minimize the occurrence of the capacitor being fully charged at a time when it would be desired to be able to absorb high current, for example from regenerative braking. Likewise it is possible to minimize the occurrence of the capacitor being nearly discharged at a time when it would be desirable to have boost power available. A result is that even a relatively small ultracapacitor (having perhaps one two-hundredth the energy storage capacity of the battery) can permit greatly reducing waste heat dissipated in the battery, and can reduce otherwise unnecessary cycling of current into and out of the battery. This can extend battery life and battery performance.

18 Claims, 6 Drawing Sheets

(51) Int. Cl.
  *B60L 11/00* (2006.01)
  *B60L 3/00* (2006.01)
  *B60L 11/18* (2006.01)

(52) U.S. Cl.
  CPC ........ *B60L 11/1861* (2013.01); *B60L 2240/36* (2013.01); *B60L 2250/22* (2013.01); *Y02T 10/705* (2013.01); *Y02T 10/7005* (2013.01); *Y02T 10/7022* (2013.01); *Y02T 10/7044* (2013.01); *Y10T 307/625* (2015.04)

(56) References Cited

U.S. PATENT DOCUMENTS

| | | | | |
|---|---|---|---|---|
| 7,960,857 | B2 * | 6/2011 | King | 307/10.1 |
| 8,258,793 | B2 * | 9/2012 | Frisch et al. | 324/433 |
| 2003/0184307 | A1 * | 10/2003 | Kozlowski et al. | 324/427 |
| 2004/0089491 | A1 | 5/2004 | Reuter | |
| 2006/0250902 | A1 * | 11/2006 | Bender et al. | 369/1 |
| 2006/0284617 | A1 * | 12/2006 | Kozlowski et al. | 324/426 |
| 2008/0048622 | A1 * | 2/2008 | Fee et al. | 320/141 |
| 2008/0302014 | A1 * | 12/2008 | Szczerba et al. | 49/31 |
| 2009/0212626 | A1 | 8/2009 | Snyder | |
| 2010/0036560 | A1 * | 2/2010 | Wright et al. | 701/36 |
| 2012/0319471 | A1 * | 12/2012 | Miller | 307/9.1 |

FOREIGN PATENT DOCUMENTS

| | | |
|---|---|---|
| DE | 10042414 | 3/2002 |
| DE | 102007012505 | 10/2008 |
| EP | 2119585 | 11/2009 |
| JP | 2000-152420 | 5/2000 |
| JP | 2009-72020 | 4/2009 |
| JP | 2009-264545 | 11/2009 |
| JP | 2011-517924 | 6/2011 |
| WO | WO 2009/108565 A2 | 9/2009 |

* cited by examiner

ENERGY STORAGE SYSTEMS AND METHODS

This patent application claims the benefit of U.S. patent application Nos. 61/298,204 and 61/298,206, each filed Jan. 25, 2010, each of which is hereby incorporated herein by reference for all purposes.

BACKGROUND

In many high-power systems, the combination of an ultracapacitor and a battery works much better than the battery by itself. But present-day systems, even those that employ both an ultracapacitor and a battery, leave much room for improvement. The system performance is not nearly as good over the full range of actual loads and service use. And the battery does not last as long as one might wish. As will be explained in great detail below, the invention offers better performance and an expectation of longer battery life. But first, some background will be provided which may establish some terminology and which may help in an appreciation of the great needs that were until now unfulfilled.

FIG. 1 shows a simplified block diagram of a hybrid automobile 21. An internal combustion engine and alternator 23 provide electric power to motor-generator 24, which is in turn coupled mechanically to a drive train and wheels 25. Importantly, the automobile uses regenerative braking, in which the automobile is slowed down by converting kinetic energy through the drive train 25 to the motor-generator 24, into electrical energy which is stored in energy storage system 26. Energy storage system 26 is idealized as a two-terminal device at terminals 30, 31. In many present-day hybrid cars the chief (or perhaps only) component of the energy storage system 26 is an electrochemical battery 22. Energy developed through regenerative braking and stored in storage system 26 may later be used instead of, or in addition to, that of the engine-alternator 23 to power the motor-generator 24.

As compared with a conventional automobile using only an internal combustion engine, the hybrid automobile 21 offers improved fuel economy, in part because of the use of regenerative braking. The improved fuel economy is gained at a cost, of course, namely the not insubstantial manufacturing cost of the battery 22 as well as a later disposal or recycling cost of that very large battery. Remarkably, even though the automobile 21 is burdened with having to move a very heavy battery 22 from place to place, the automobile 21 nonetheless enjoys the improved fuel economy just mentioned.

Although hybrid cars are still relatively recent in day-to-day experience, it is already beginning to be appreciated that battery life matters a lot. If some invention were to offer the prospect of a greater battery life, this would be very good news for at least three reasons—first, the substantial expense of the battery in the first place could be spread out over a longer service life, second, the expense of disposal or recycling of the battery could be postponed, and third, the inconvenience to the user of battery failure or the related out-of-service interval during battery replacement could be reduced or postponed.

As mentioned above, FIG. 1 is simplified. For example FIG. 1 shows a single motor-generator 24 connected by means of a transfer case and two differentials to the four wheels. It should be appreciated, however, that another approach is to employ four motor-generators, each coupled mechanically to a respective wheel.

It will also be appreciated that the automobile 21 has switches and other control electronics that are omitted for clarity in FIG. 1, but that are important to bring about the same results as an accelerator pedal or brake pedal in a conventional car. There are also fuses or fusible links in the lines connecting to the battery 22, so as to cut power in the event of a short circuit external to the battery 22. There may also be one or more temperature sensors within the battery 22 which are intended to permit derating the battery until the over-temp condition has passed.

FIG. 2 shows a typical energy storage system 26 such as is shown in FIG. 1, in greater detail. Battery 22 contains a number of electrochemical cells 27 in series. (It will be appreciated that series-parallel arrangements, though not shown in FIG. 2, may also be employed.)

The battery 22 is an electrochemical device, storing and releasing energy through chemical reactions. The chemical reactions cannot happen instantly but take some time. The chemical reactions can also generate some heating. This means that the battery cannot deliver all or part of its stored energy instantly, but takes some time to deliver its energy. This likewise means that if energy enters the storage system from outside (for example due to regenerative braking), such energy cannot be instantly stored to the battery but takes some time to do so. Efforts to draw large amounts of energy very quickly from the battery can lead to heating which offers several drawbacks—first, the heating represents a waste of energy that could otherwise have been put to some good use, second, the heating represents a need to design a mechanism for dissipating the heat from the battery, and third, the heating can reduce the service life and can increase the risk of premature failure.

For a given choice of battery chemistry, and for a given detailed battery design, experience shows that a battery will have only some limited number of charge-discharge cycles available in its service life. (As mentioned above, operational extremes such as over-temp or overly high current drains or charging currents could reduce the number of available charge-discharge cycles from what would otherwise be available.)

These factors and others have, in very recent times, prompted system designers to try putting an ultracapacitor in parallel with the battery. FIG. 3, for example, shows an energy storage system 26 composed of an ultracapacitor 28 (composed of a number of individual ultracapacitors 29 in series) in parallel with a battery 22. This approach does offer benefits over the use of the battery 22 alone (as in FIG. 2). The ultracapacitor can receive energy (for example from regenerative braking) very quickly, much faster than a battery can. When energy is to be delivered to a load (for example for quick acceleration), the ultracapacitor can supply energy to that load very quickly, again faster than a battery can.

As mentioned above, experience shows that the combination of an ultracapacitor and a battery often works much better than the battery alone. This has prompted investigators to try using larger and smaller ultracapacitors to see whether there is (for a particular application) some optimum ratio of size for the ultracapacitor and the battery. This has also prompted investigators to consider whether a more complicated connection between the ultracapacitor, the battery, and the load may lead to better results than the simple connection portrayed in FIG. 3.

One approach is to make use of a "power converter" in connection with the ultracapacitor and the battery. In a typical embodiment, a power converter forces current to flow in either of two directions, as directed by a control line indicative of desired current flow. Such a power converter may, for example, contain two buck converters, one pointed in each direction, and two boost converters, one pointed in each direction, and control electronics turning on one of the four converters (to the exclusion of the other three) with whatever duty cycle is required to bring about the desired current flow. In a null state (no control signal applied) the converter will preferably come as close as possible to being a straight wire.

FIG. 4 shows an energy storage system 34 which presents itself to the load as a two-terminal device at pins 30 and 31. Ultracapacitor 28 may be seen, along with battery 20. Importantly, in the system of FIG. 4, there is a power converter 32 which presents itself to the system as a two-terminal device at pins 35 and 36. A control line 33 delivers control signals to the power converter 32.

FIG. 5 shows an energy storage system 34 in an alternative to that of FIG. 4. The system 34 in FIG. 5 again presents itself to the load as a two-terminal device at pins 30 and 31. Ultracapacitor 28 may again be seen, along with battery 20. Importantly, in the system of FIG. 5, the power converter 32 is in series with the battery 20 rather than being in series with the ultracapacitor 28. Again a control line 33 delivers control signals to the power converter 32.

Turning momentarily ahead to FIG. 10, we see a more detailed depiction of the storage system 34 of FIG. 4. Terminals 30, 31 connect to loads and/or power sources external to the system 34. A battery 22 connects to the terminals 30, 31 through current sensor 49 and voltage at the battery 22 is measured by voltage sensor 57. Capacitor 28 is provided, which is preferably an ultracapacitor. Power converter 32 permits controlled passage of power from the battery to the capacitor or from the capacitor to the battery (or not at all) under control of current drive line 33. Voltage sensor 47 senses the voltage across the capacitor 28, and current sensor 45 senses current into or out of capacitor 28. Current sensor 53 senses current into or out of battery 22. Temperature sensors 43, 51 sense internal temperature of capacitor 28 and battery 22 respectively. Sense lines 44, 46, 48, 52, 54, 50, 58 provide information from the just-described sensors to an energy management system controller 55. Controller 55 provides a current drive signal at the current drive line 33. Controller 55 has a bidirectional control/data bus 56 which may be communicatively coupled with circuitry external to the architecture 34. Other signals, omitted for clarity in FIG. 10, can include a signal from a sensor of ambient temperature in the system, and a "status" signal from the power converter.

In FIG. 10 the energy management system (EMS) controller 55 monitors the ultracapacitor temperature, current and voltage (at lines 44, 46, and 48 respectively), the battery temperature, current and voltage (at lines 52, 54, and 58 respectively), and the current to and from the load (at line 58). The controller 55 has control inputs from CAN or other communications channel 56, and reports out to the same communications channel 56, and generates the power converter current command on line 33.

Turning back now to FIG. 6 we see an exemplary embodiment, with the energy storage system 34 (from FIG. 4) visible, coupled with motor-generator 24, which is in turn mechanically coupled with drive train 25.

It is known to employ a controller such as depicted in FIGS. 10 and 4 to attempt to optimize the performance of the system 34. For example such a controller may have a set-point such that efforts are made to push the charge on the ultracapacitor toward a level that is 77 percent of capacity. It turns out, however, that with typical real-life drive trains and real-life loads, the ability of the ultracapacitor 28 to provide its benefits will quickly collapse as the capacitor drains to near zero (at a time when the capacitor is being asked to supply power to the load, probably with the power converter in boost mode toward the load). Likewise when the ultracapacitor 28 is nearly full, then its benefits will quickly disappear if there is a need for the ultracapacitor to absorb a lot of energy from regenerative braking.

It would be desirable if approaches could be found that would permit better and more sophisticated control of the energy storage system. If, for example, the controller could be configured more intelligently, this might bring about the desired improved control of the energy storage system. Such approaches might offer better battery life, might reduce losses due to heating, might permit the designer to get by with a smaller ultracapacitor, and might permit the designer to get by with a smaller battery.

SUMMARY OF THE INVENTION

In an energy storage system that includes a battery and an ultracapacitor, the state of charge (SOC) of the capacitor is the subject of a dynamic set-point. This dynamic set-point control is a function of the load regime to which the storage system is exposed, for example a hybrid automobile or electric automobile. The control may be based in part upon real-time fast Fourier transform analysis of load current, permitting real-time adjustment of control coefficients. In this way, it is possible to minimize the occurrence of the capacitor being fully charged at a time when it would be desired to be able to absorb high current, for example from regenerative braking. Likewise it is possible to minimize the occurrence of the capacitor being nearly discharged at a time when it would be desirable to have boost power available. A result is that even a relatively small ultracapacitor (having perhaps one two-hundredth the energy storage capacity of the battery) can permit greatly reducing waste heat dissipated in the battery, and can reduce otherwise unnecessary cycling of current into and out of the battery. This can extend battery life and battery performance.

DESCRIPTION OF THE DRAWING

The invention will be described with respect to a drawing, of which.

Where possible, like elements have been shown with like reference numerals.

DETAILED DESCRIPTION

Figure 6:
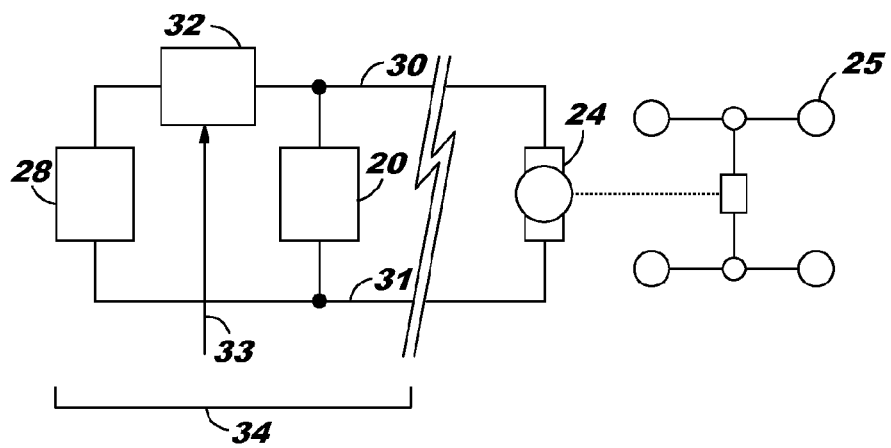
FIG. 6 shows in functional block diagram the first topology for an energy storage system such as in FIG. 4 with an ultracapacitor and a battery, connected with a motor-generator and a drive train.

To more fully appreciate the invention, it is helpful to describe some of the current flows that might happen in operation of the automobile of FIG. 6.

Figure 7:
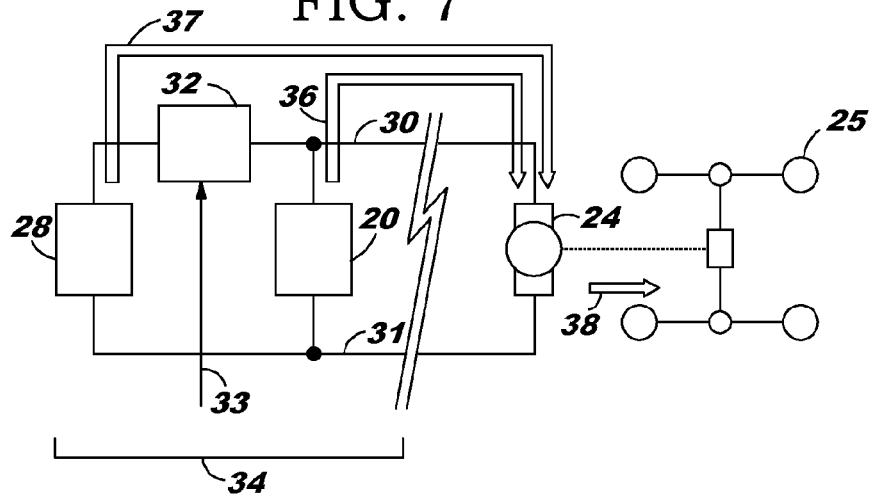
FIG. 7 shows the system of FIG. 6 with power flowing toward the motor-generator.

In the event of a heavy load (for example if the automobile is going uphill, or if the operator is pressing the accelerator pedal, or both), then motor 24 may draw current 37 from the ultracapacitor 28 and may draw current 36 from the battery 20, as shown in FIG. 7. Kirchhoff's law would, of course, be satisfied, so that the current through terminal 30 (and thus through terminal 31) will be the sum of the two currents just mentioned.

Figure 8:
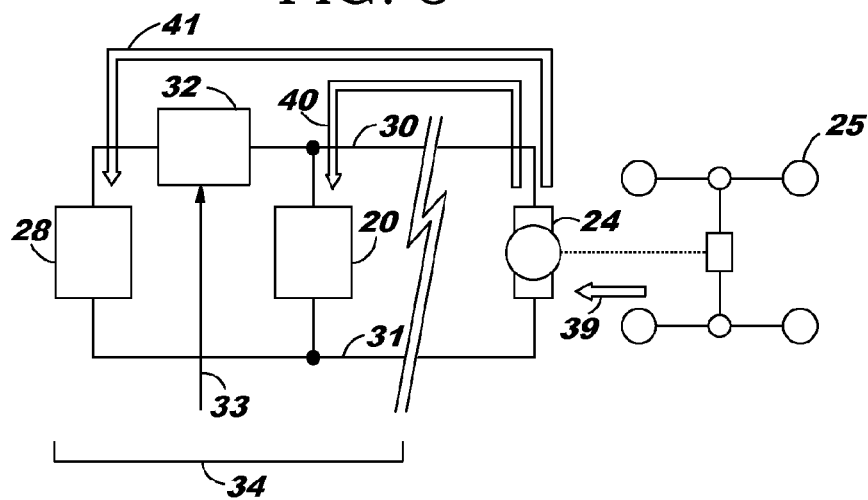
FIG. 8 shows the system of FIG. 6 with power flowing from the motor-generator toward the energy storage system.

FIG. 8, in contrast, shows the system of FIG. 6 with current flowing from the motor-generator toward the energy storage system. For example the operator of the automobile may be pushing hard on the brake, which causes the motor-generator 24 to become a generator, giving rise to regenerative braking. In such a case there may be a current 41 flowing into the capacitor 28 and a current 40 flowing into the battery 20. Just as in FIG. 7, Kirchhoff's law would be satisfied, so that the current through terminal 30 (and thus through terminal 31) will be the sum of the two currents just mentioned.

Figure 9:
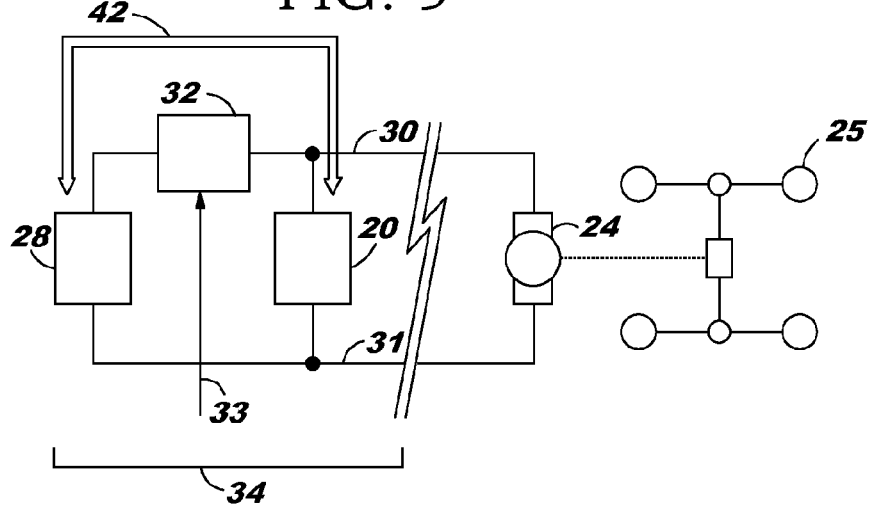
FIG. 9 shows the system of FIG. 6 with power passing in one direction or another between the ultracapacitor and the battery.

FIG. 9 shows the system of FIG. 6 with current 42 passing in one direction or another between the ultracapacitor and the battery, at a time when there is little or no current through the load at motor-generator 24.

As mentioned above, in at least one prior-art system, the control signals to the power converter attempt to preserve an SOC (state of charge) of the ultracapacitor 28 of 77%. That is, the control signals try more or less to return the SOC to 77% after excursions away from that level. With such a prior-art system, it can easily happen that the capacitor becomes fully depleted or becomes fully charged, at a time when it would have been better had the SOC been at some other level.

When the capacitor gets fully charged, for example, then any further current received back from the generator will have nowhere to go but to battery 20. The current may exceed the normal optimal charge current for the battery, thus leading to battery heating or other energy waste in whatever parts of the system are able to absorb or dissipate currents (or portions thereof) that are unable to be received by either the capacitor or the battery.

When the capacitor approaches emptiness, for example, then to the extent that it is desired to deliver high power to the motor, such delivery will not be able to come from the capacitor, and such power as may be delivered by the battery will be limited to the battery's ability to deliver that power. If, for example, we model the battery as having some internal resistance, then the effort to draw a very high level of power from the battery will be expected to give rise to battery heating. Such heating wastes energy and risks shortening the battery life.

According to the invention, the controller for the energy storage system 34 may bring about superpositions of the currents of FIG. 9 with currents such as are shown in FIGS. 7 and 8. As will be described in some detail, this may permit a reduction to a minimum (or even elimination) of the unhappy outcome of the ultracapacitor 28 getting nearly depleted just when it would be helpful for the capacitor to be able to boost the power delivered to the motor 24. Similarly, this may permit a reduction to a minimum (or even elimination) of the unhappy outcome of the ultracapacitor 28 reaching full charge just when it would be helpful for the capacitor to be able to store some power delivered from the generator 24.

One embodiment of the invention, then, is the provision of what we term a dynamic set-point control. By this is meant an innovation in that the ultracapacitor state-of-charge, SOC, is actively regulated to seek out its initial setting. For example, as mentioned above, typical ultracapacitor SOC setpoints are nominally 77% depending on the anticipated type of vehicle and anticipated drive cycle. The dynamic SOC set-point regulator implements this function by continuously calculating the ultracapacitor pack SOC and then using this to schedule the feedback gains of the dc-dc converter control loops regardless of the mode at any particular instant. This will be described in more detail below.

A related aspect of the invention is the high-level adjustment of energy management and dc-dc converter feedback signal discrimination that enables the converter to respond to primarily the dynamics of the vehicle road load, rather than merely responding to average components. With this aspect of the invention, the battery branch (the circuitry around battery 20) will experience a continuous SOC depletion, known as charge depleting or "CD" mode. In CD mode an electric vehicle energy battery experiences a more or less continuous and low rate of discharge.

The battery 20 in an exemplary embodiment can be a lead-acid, VRLA battery with a capacity of 150 Ah, 75V, thus providing about 11 kWh. But as will be appreciated, the teachings of the invention are applicable to any energy storage system including nickel-metal-hydride, lithium-ion or fuel cells.

The high-power dynamics that are superimposed upon CD mode are routed to the ultracapacitor and converter branch in an actively parallel way. This partitioning of road load power between the battery for CD mode on the one hand, and the ultracapacitor for charge sustaining (i.e., dynamic setpoint control) CS mode on the other hand, is a sensitive part of the energy management strategy.

In one example developed through simulation, a neighborhood type electric vehicle, NEV, had a battery with a capacity of 11 kWh and an ultracapacitor with a usable capacity of only 54 Wh. This is an energy ratio of about 204 to 1. In the simulation, the results were very dramatic in that quite a lot of heating load was removed from the battery. In this simulation, the gain scheduler acted to capture virtually 100% of regenerative braking energy to the ultracapacitor (rather than forcing the battery to soak up this energy). In this simulation, the ultracapacitor in turn delivered boosting to the battery at approximately a 50-50 ratio (that is, providing as much as 50% of the energy absorbed by the load).

It will be appreciated that these ratios are dependent upon the relative ultracapacitor energy storage capacity as compared with the (for example) lithium-ion pack energy storage capacity, and the designed-for system power capability.

A starting strategy for high-level road load power signal discrimination is to use offline Fourier transform methods to extract frequency components from road load power measurements. The Fourier results can be used to set the coefficients of a main feedback filter G1(s).

Figure 10:
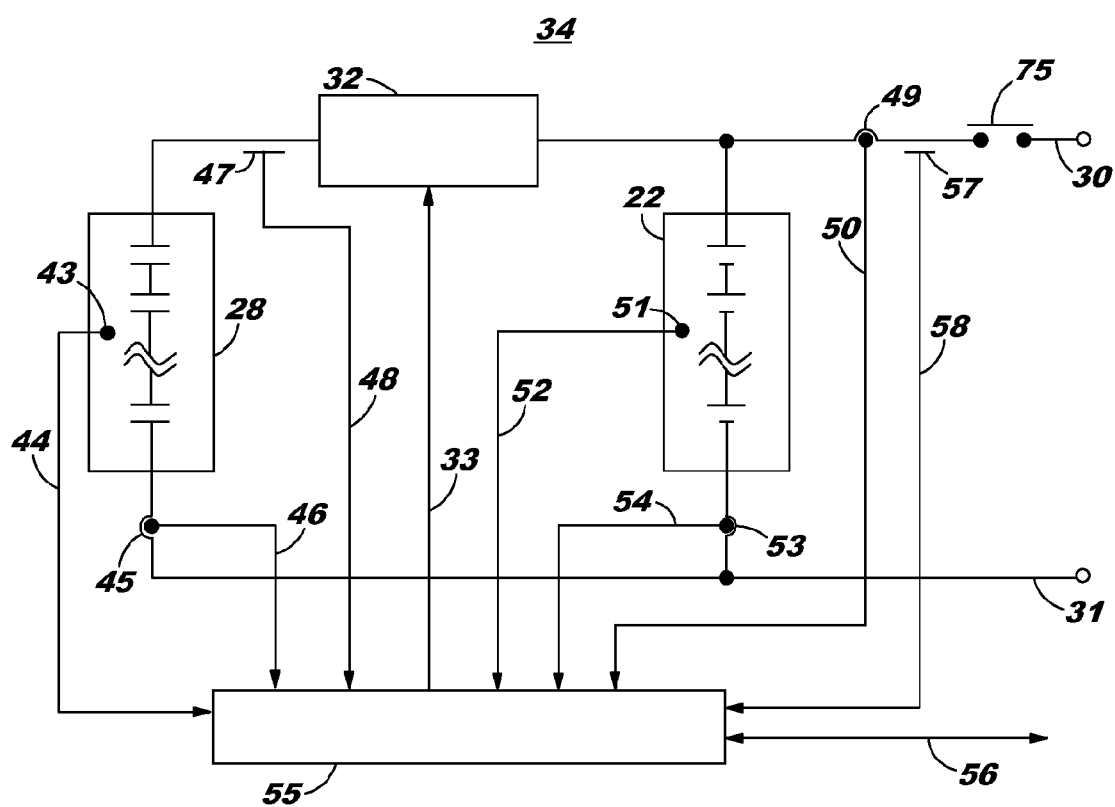
FIG. 10 shows the system of FIG. 4 in greater detail.

It is considered desirable, however, merely to start with such offline Fourier technique to adjust G1(s) coefficients, and then to carry out real-time measurements. Preferably the controller 55 will be an online or embedded controller, developing control coefficients by performing an FFT (Fast Fourier Transform) upon the sensed load current of the application electric drive. In FIG. 10, for example, the controller 55 may sense load current at 49 via line 50 with the FFT carried out upon that sensed current over an interval of time.

Although a variety of particular control approaches may be employed to bring about the results sought herein, one approach thought to be fruitful is simply to average the lowest three to five frequencies (from the results of the FFT) and from this nominal value setting the filter coefficients depending on type.

As mentioned above, one of the areas for flexibility in configuration of the system is the dynamic adjustment of a set-point defining a value toward which the SOC is driven as a function of monitored load current. If the system is in a motor vehicle, and if the operator of the motor vehicle tends to (for example) jam on the brakes pretty often and pretty suddenly, then it may make sense to adjust the set-point downwards so as to leave some capacity in the capacitor for absorbing current from regenerative braking. This heuristic approach is intended to permit the system to learn something about the likely needs of the system as a function of the particular operator involved. When such a heuristic approach is followed, according to an embodiment of the invention, there may be events that are capable of being sensed that are indicative of a change of operator of the system. For example if the system is part of a motor vehicle with a seat having an adjustable position, the sensed event may comprise adjustment of the position of the seat. As another example if the system is part of a motor vehicle with a mirror having an adjustable position, the sensed event may comprise adjustment of the position of the mirror.

Figure 13:
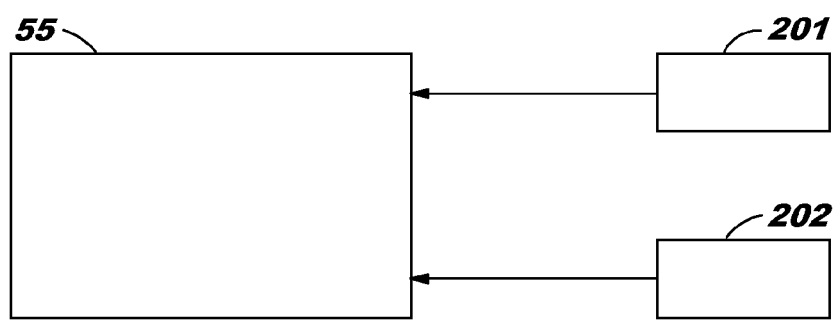
FIG. 13 portrays some sensors in functional block diagram depiction.

Turning ahead momentarily to FIG. 13, we see the controller 55 receiving inputs from mirror adjustment system 201 and from seat adjustment system 202.

Returning now to FIG. 10, the ultracapacitor 28 is connected to one terminal of the dc-dc converter 32 with the ultracapacitor's voltage Uc (sensed at 47) and current Ic (sensed at 45) monitored by lines 46, 48. Ultracapacitor voltage and pack rated voltage, Umx (the maximum permitted voltage across the ultracapacitor), are used by the SOCuc calculator to determine the state-of-charge of the ultracapacitor. Given the SOC, then from the SOC, gain scheduling of the load current regulator is carried out by means of the dynamic set-point control. Battery current is monitored (at 53) and is used to derive battery SOC for reference. Modeling of the converter 32 using state-space averaged modeling relies on measured signals and relies upon sensed load current for example at 49. For example in some vehicles the motor 24 is an AC motor and so a power inverter (omitted for clarity in the functional block diagrams mentioned above) is used as part of an AC drive unit comprised of the inverter and an AC fraction motor.

Figure 1:
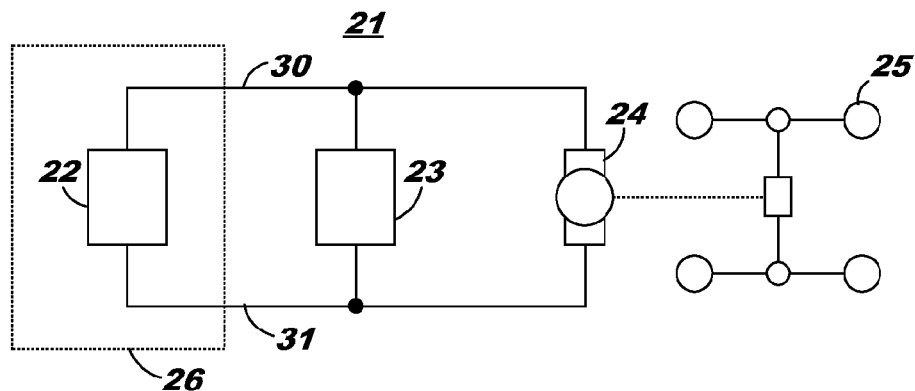
FIG. 1 shows a prior-art hybrid car with an internal combustion engine and an energy storage system according to the prior art.
Figure 2:
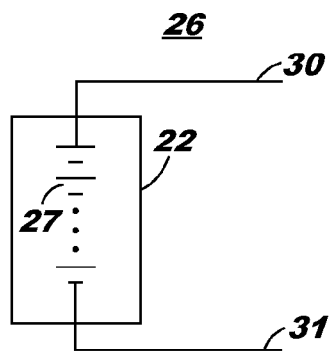
FIG. 2 shows an energy storage system according to the prior art.
Figure 3:
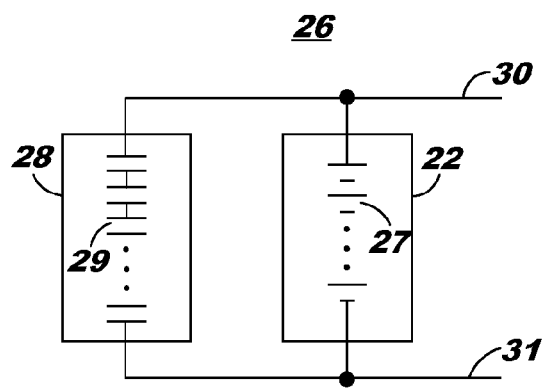
FIG. 3 shows an energy storage system with an ultracapacitor and a battery according to the prior art.

Many of the teachings of the invention have been described in some detail in connection with an exemplary hybrid car, meaning a car that uses an internal combustion engine 23 as well as an energy storage system 22 as in FIG. 1. But it will be appreciated that nearly all of the teachings of the invention will offer their benefits as well in an electric car (a car that does not have an internal combustion engine and instead relies upon recharging of the battery from time to time). With such an electric car, the needs discussed above are likewise present—avoiding waste heating of the battery, trying to avoid emptying the ultracapacitor just when boost power is needed, trying to avoid arriving at a 100% SOC of the ultracapacitor just when it would be desired to absorb power due to regenerative braking.

Turning to the power converter, it is helpful to consider that the exact design of the power converter is not critical. As a general matter it is desirable that the power converter be as efficient as possible, so as not to throw off waste heat. While a suitable approach is thought to be provided by the two boost converters and the two buck converters described, many power converter designs other than what has been described above will serve the ends set forth herein.

Figure 11:
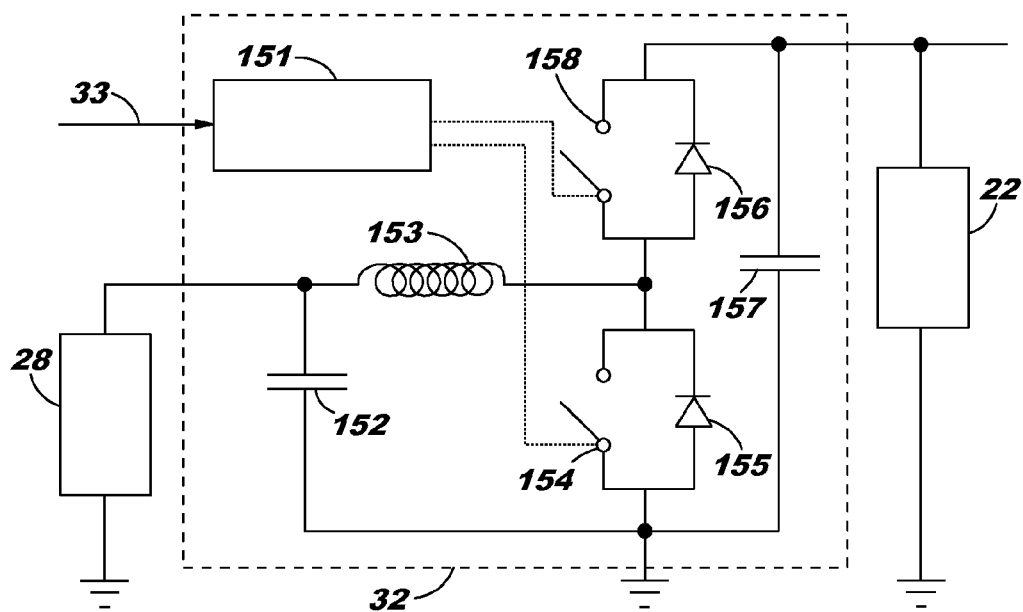
FIG. 11 shows a power converter in greater detail.

Turning now to FIG. 11, the converter 32 is shown in greater detail. The converter 32 is basically a three-terminal device (not counting control line 33 and a status line 76, the latter omitted for clarity in FIG. 11). A first terminal connects with the ultracapacitor 28, a second terminal connects with the battery 22, and a third terminal is ground. Inside the converter 32 is a half-wave boost-buck bidirectional circuit to be described in more detail. Switches 154, 158 are controlled by control 151 which takes its commands on line 33 as mentioned above in connection with FIG. 10. Switches 154, 158 are paralleled by rectifiers 156, 155 respectively. Inductor 153 and capacitors 152, 157 are also seen.

It will be appreciated that other bidirectional power converter topologies may be employed, such as a full-wave boost-buck converter, a Cúk converter, or a SEPIC/Luo converter. Some of the factors that might affect the choice of particular converter topology are discussed in "Comparing DC-DC Converters for Power Management in Hybrid Electric Vehicles", R. M. Schupbach, J. C. Balda, Electric Machines and Drives Conference, 2003, IEEE International, Volume 3, pages 1369-1374 (2003), which is incorporated herein by reference. Any of several suitable topologies could be employed without departing in any way from the invention.

Figure 12:
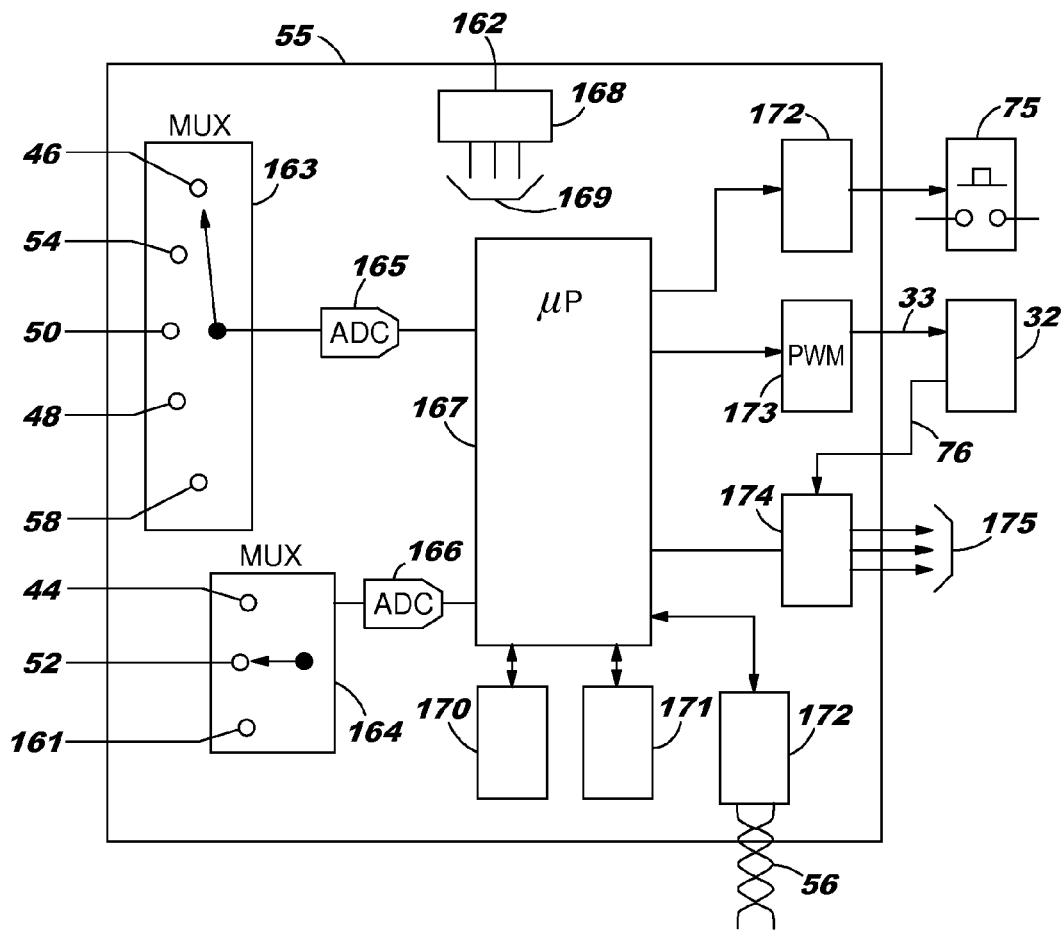
FIG. 12 shows a controller in greater detail.

FIG. 12 shows the controller 55 in greater detail. A microprocessor 167 executes code in ROM or PROM or EPROM 170 and uses RAM 171. A communications bus interface 172 permits the processor 167 to communicate on bus 56 (see FIG. 10). Power (typically 12 VDC) is provided at 162 and power supply 168 develops voltages 169 used at various locations within the controller 55. Digital I/O 174 permits the processor 167 to receive status information on line 76 from the power converter 32, and permit the processor 167 to provide discrete outputs 175 such as, for example, annunciation of over-voltage, over-current, or over-temperature conditions, or fault conditions, on an indicator panel visible to the user. The chief control outputs are an output to contactor 75 (via output driver 172) and an output 33, typically pulse-width-modulated, to power converter 32 by means of driver 173.

Inputs to the controller 55 are for example the current at the ultracapacitor on line 46, the current at the battery on line 54, the external current 50, the voltage at the capacitor on line 48, and the voltage at the battery on line 58. These signals, each analog in nature, are multiplexed at 163 and made available to analog-to-digital converter 165 to the processor 167. The current measurements may be made in any of a number of ways without departing from the invention, for example by means of a toroid surrounding the current-carrying conductor, or a leaf-shunt or Hall-effect sensor. The voltage measurements may be made in a number of ways without departing from the invention.

Other inputs to the controller include temperature measurements at the ultracapacitor on line 44 and at the battery on line 52, as well as an ambient-temperature measurement on line 161. These temperature measurements may be performed for example by RTDs or thermocouples or other ways, without departing from the invention. Each such signal is passed to an appropriate analog processing circuit depending on the type of sensor being used (omitted for clarity in FIG. 12) and thence to a multiplexer 164 and to an analog-to-digital converter 166 and thence to the processor 167.

Suitable ESD (electrostatic discharge) protective circuitry is provided at each input or output to reduce the susceptibility of the controller to such harms. Suitable EMI (electromagnetic interference) circuitry is provided to minimize propagation of EMI from the controller to other devices nearby. The ESD and EMI circuitry is omitted for clarity in FIG. 12.

Figure 4:
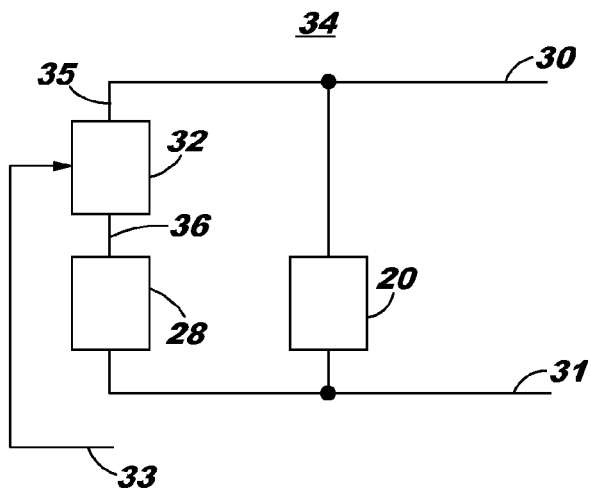
FIG. 4 shows in functional block diagram a first topology for an energy storage system with an ultracapacitor and a battery.
Figure 5:
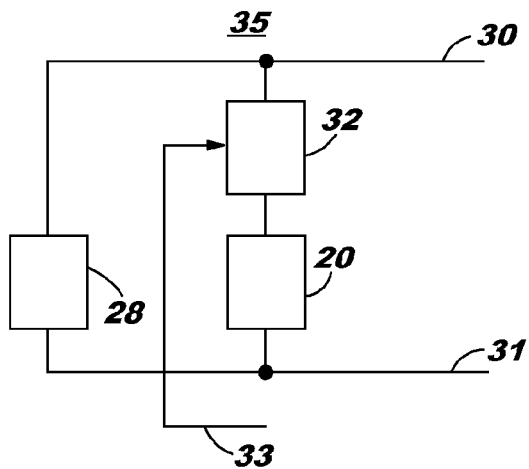
FIG. 5 shows in functional block diagram a second topology for an energy storage system with an ultracapacitor and a battery.

It will also be appreciated that although the topology of FIG. 4 is thought to be preferable, many if not all of the ends set forth herein are nearly as well served if the topology of FIG. 5 is employed instead.

Those skilled in the art, inspired by and gaining insight from the teachings herein, will have no difficulty devising myriad obvious improvements upon and variants of the invention, without departing from the invention; all such obvious improvements and variants are intended to be encompassed by the claims which follow.

What is claimed is:

1. A method for use with an energy storage system connected with a variable load, the load at some times drawing power from the energy storage system and at other times regenerating power to be stored within the energy storage system, the power draw being greater at some times and lesser at other times, the regenerated power to be stored being greater at some times and lesser at other times, the energy storage system comprising a storage battery and an ultracapacitor, the method comprising the steps of:

monitoring the state-of-charge (SOC) of the ultracapacitor;

dynamically establishing a set point toward which the SOC is configured to be driven; and adjusting the dynamic set point as a function of sensed load currents, wherein the sensed load currents are sensed between the storage system and the load, and wherein the dynamic establishment of the set point is a function of an average of the lowest three frequencies obtained by a fast Fourier transform of the sensed load currents.

2. The method of claim 1, further comprising driving the SOC of the capacitor toward the set point, wherein the driving is carried out so as to allocate more current to charging of the capacitor if the SOC is approaching zero, even if current is also being supplied by the battery to the load, and wherein the driving is carried out so as to allocate less current to charging of the capacitor if the SOC is approaching 100%, even if current is also being supplied by the load to the battery.

3. The method of claim 1, wherein monitoring the SOC of the ultracapacitor comprises sensing an ultracapacitor voltage $U_c$ and calculating the SOC based upon the sensed ultracapacitor voltage $U_c$ and a maximum permitted ultracapacitor voltage $U_{mx}$ of the ultracapacitor.

4. The method of claim 1, wherein adjusting the dynamic set point comprises scheduling feedback gains of a control loop configured to adjust the amount of current flowing between the ultracapacitor and the battery.

5. The method of claim 1, further comprising adjusting the amount of current flowing between the ultracapacitor and the battery based upon the dynamic set point.

6. The method of claim 5, wherein adjusting the amount of current flowing between the ultracapacitor and the battery comprises adjusting the amount of current flowing between the ultracapacitor and the battery when the sensed load current is approximately zero.

7. The method of claim 1, further comprising resetting the set-point upon occurrence of a sensed event indicative of a change of operator of the system.

8. The method of claim 7 wherein the system is part of a motor vehicle with a seat having an adjustable position, the sensed event comprising adjustment of the position of the seat.

9. The method of claim 7 wherein the system is part of a motor vehicle with a mirror having an adjustable position, the sensed event comprising adjustment of the position of the minor.

10. An energy storage system for connection with a variable load, the load at some times drawing power from the energy storage system and at other times regenerating power to be stored within the energy storage system, the power draw being greater at some times and lesser at other times, the regenerated power to be stored being greater at some times and lesser at other times, the energy storage system comprising:

a storage battery;

an ultracapacitor having a state of charge (SOC);

a power converter in series with the ultracapacitor;

the ultracapacitor and power converter together in parallel with the battery and in turn disposed for connection with the variable load;

a load current sensor configured to sense a load current between the storage system and the load; and a controller connected with the load sensor and one or more SOC sensors configured to determine the SOC of the ultracapacitor;

wherein the controller is configured to be responsive to one or more of the sensed load currents for dynamically establishing a set point toward which the SOC is configured to be driven, and adjusting the dynamic set point as a function of the sensed load current, and wherein the controller is configured to dynamically establish the set point as a function of an average of the lowest three frequencies obtained by a fast Fourier transform of a plurality of the sensed load currents.

11. The energy storage system of claim 10 wherein the controller is configured to drive the SOC of the ultracapacitor such that more current is allocated to charging the capacitor if the SOC is approaching zero, even if current is also being supplied by the battery to the load, and wherein the controller is configured to drive the SOC of the ultracapacitor such that less current is allocated to charging the capacitor if the SOC is approaching 100%, even if current is also being supplied by the load to the battery.

12. The energy storage system of claim 10, further comprising a voltage sensor configured to sense an ultracapacitor voltage $U_c$, wherein the controller is configured to calculate the SOC based upon the sensed ultracapacitor voltage $U_c$ and a maximum permitted ultracapacitor voltage $U_{mx}$ of the ultracapacitor.

13. The energy storage system of claim 10, wherein the controller is configured to schedule feedback gains of the power converter based upon the dynamic set point to adjust the amount of current flowing between the ultracapacitor and the battery.

14. The energy storage system of claim 10, wherein the controller is configured to adjust the amount of current flowing between the ultracapacitor and the battery based upon the dynamic set point.

15. The energy storage system of claim 14, wherein the controller is configured to adjust the amount of current flowing between the ultracapacitor and the battery when the sensed load is approximately zero.

16. The energy storage system of claim 10 wherein the controller is configured to reset the set-point in response to a sensed event indicative of a change of operator of the system.

17. The energy storage system of claim 16 wherein the system is part of a motor vehicle with a seat having an adjustable position, wherein the sensed event comprises adjustment of the position of the seat.

18. The energy storage system of claim 16 wherein the system is part of a motor vehicle with a minor having an adjustable position, wherein the sensed event comprises adjustment of the position of the minor.

* * * * *